Dec. 16, 1924.
A. O. STUBBS
MILK STRAINER
Filed Feb. 13, 1923
1,519,421
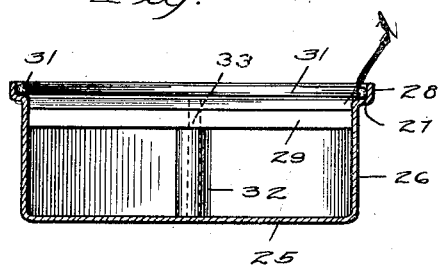
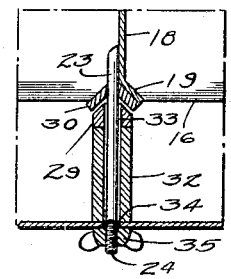
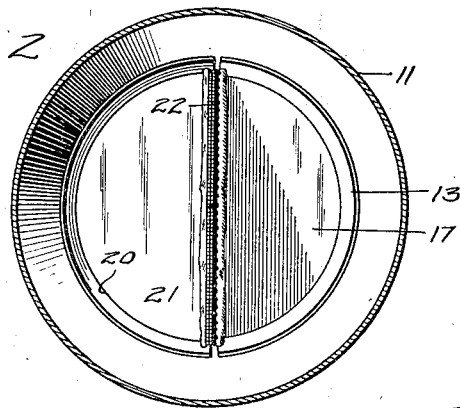
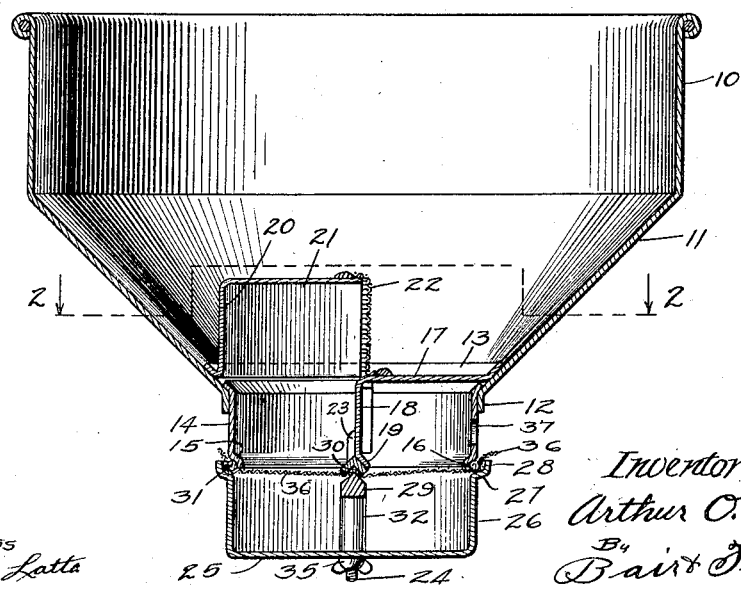

Patented Dec. 16, 1924.

1,519,421

UNITED STATES PATENT OFFICE.

ARTHUR O. STUBBS, OF DES MOINES, IOWA.

MILK STRAINER.

Application filed February 13, 1923. Serial No. 618,765.

*To all whom it may concern:*

Be it known that I, ARTHUR O. STUBBS, a citizen of the United States, and a resident of Des Moines, in the county of Polk and State of Iowa, have invented a certain new and useful Milk Strainer, of which the following is a specification.

The object of my invention is to provide a milk strainer of novel construction wherewith milk can be properly strained and foreign material removed therefrom.

Still a further object is to provide such a strainer embodying a simple construction whereby milk may be passed through a wire gauze screen and thence through a cloth screen or strainer in such manner as most effectively accomplishes the purpose to remove foreign material from the milk.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a vertical sectional view taken a little off center through a strainer embodying my invention.

Figure 2 shows a horizontal, sectional view of the strainer taken on the line 2—2 of Figure 1.

Figure 3 shows a vertical, sectional view taken a little off center through the lower part of the strainer taken at right angles to the view shown in Figure 1; and Figure 4 shows a detail, central, sectional view through the lower parts of the strainer.

In the accompanying drawing, I have used the reference numeral 10 to indicate generally the milk receiving member which has a tapered bottom 11 open at its lower end and terminating in an annular downwardly projecting flange 12. The bottom 11 is designed to fit in and above the flaring top of an ordinary milk can.

Mounted in the lower end of the bottom 11 of the milk receiving member is my strainer device proper.

Resting on the inside of the bottom 11 at the lower end thereof and arranged to fit said lower end as shown in Figure 1, is an annular flange 13 formed on the upper end of a downwardly projecting tubular member 14.

At its lower end the tubular member 14 has a short, inwardly projecting annular flange 15 terminating in a downwardly projecting flange 16. Connected with and extending horizontally from one-half of the flange 13 half way across the top of the member 14, is a horizontal partition member 17 which at its inner edge has a vertical partition 18 extending downwardly and extending from side to side on the inside of the member 14.

The member 18 terminates at its lower end in a downwardly and laterally inclined flange 19. Secured to and extending upwardly from the other half of the flange 13, opposite the horizontal partition 17 is a semi-cylindrical wall 20 above which is a top or cover 21.

A wire gauze screen 22 is secured to the edge of the top 21, wall 20, and the bottom 17, extending entirely across the opening at the open end of the half cylinder formed by the member 20. Secured to the member 18, approximately at the middle thereof, from end to end, is a downwardly extending bolt 23 which is screw threaded at 24, at its lower end.

Secured to the flange 19 is a downwardly opening channel shaped member 30 extending across the lower part of the member 14.

It will be seen that the device just described which constitutes the upper half of the strainer proper is seated in the lower end of the bottom 11 and can be removed therefrom by simply lifting such device upwardly.

I provide a lower half of strainer comprising a cup shaped member having a bottom 25 and the cylindrical side wall 26.

The side wall 26 is provided at its upper end with an outwardly extending flange 27 terminating in an upwardly extending flange 28.

Extending across the upper part of the bottom half of the strainer just described, just below the flange 27 is a cross bar 29, the upper surface of which is inclined from its center portion downwardly and laterally in both directions. Received on the flange 27 is a gasket 31.

A sleeve 32 connects the bottom 25 at the center thereof, with the cross bar 29. The cross bar 29 has a hole 33 therein, registering with the opening in the sleeve 32. The bottom 25 has an opening 34 therein which registers with the hole in the sleeve 32.

In assembling my strainer, I place a piece of gauze 36 over the top of the lower half of the strainer and then place the lower half of the strainer in position with the member 23 extended through the cloth, through the cross bar 29, the sleeve 32, and the bottom 25.

A wing nut 35 is screwed on to the member 23 for holding the two parts of the strainer together.

In the use of the strainer, the bottom 11 is seated in the flaring upper end of the milk can and milk is then poured into the member 12 and will flow into the bottom 11 and then through the wire gauze 22, which will strain out any larger particles of impurities, thence downwardly through the left hand half of the gauze 36, thence across and underneath the cross bar 29 and thence upwardly through the other half of the gauze 36 into the compartment formed on the right hand side of the member 18, which may be called a partition member.

The wall 14, opposite the member 18 on the right hand side, has an opening 37 from which the milk flows into the can.

A strainer of this kind has a number of advantages. It may be quickly and easily taken apart for cleaning and scalding. The gauze 36 may be easily replaced by unscrewing the wing nut 31 and taking off the lower half of the strainer.

The wire gauze breaks the flow of the milk considerably before it strikes the left-hand half of the gauze 36 as shown in Figure 1. The sediment which may pass through the left hand half of the gauze 36, settles on the bottom 25 and the milk is then strained as it flows upwardly through the right-hand half of the gauze 36. The gauze is so arranged as to prevent the flushing of the sediment receiving portion of the strainer.

It will thus be seen that with my strainer, milk can be strained with a maximum efficiency.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

It will be obvious that this strainer may be used for a great variety of liquids other than milk.

I claim as my invention:

1. A strainer comprising a body having a tapered bottom with an opening at its lower end, a tubular member received in said opening, a partition extending across part of the upper end of said tubular member, a partition member in said tubular member extending downwardly from said first partition and having at its lower edge a channel shaped cross member, an upwardly extending compartment at the open portion of the upper end of said tubular member, having a cover, and open at one side, a screen extending across the opening at the open side of said compartment, a lower member, below said tubular member having a bottom and a wall, a cross member in said lower member, having openings to receive a rod and a gauze strainer extending across the top of said lower member between said cross members and between the lower end of said tubular member and the upper end of said lower member and means for securing the tubular and lower members together.

2. A strainer comprising a body having a tapered bottom with an opening at its lower end, an upper tubular member received in said opening, having a flange seated on said tapered bottom, a partition extending across half the upper end of said tubular member, a partition member in said tubular member extending downwardly from said first partition and having at its lower edge a channel shaped cross member, an upwardly extending compartment at the open portion of the upper end of said tubular member, having a cover and open at one side, a screen extending across the opening at the open side of said compartment, a lower member having a bottom and a wall, a cross member in said lower member, having openings to receive a rod and a gauze strainer extending across the top of said lower member between said cross members and between the lower end of said tubular member and the upper end of said lower member, a rod extending from the upper through the lower member and a fastening device thereon.

3. A strainer comprising a body having a tapered bottom with an opening at its lower end, a tubular member received in said opening, a partition extending across half the upper end of said tubular member, a partition member in said tubular member extending downwardly from said first partition and having at its lower edge a channel shaped cross member, extended across its lower edge, a rod extending downwardly from said last described partition, a nut on said rod, an upwardly extending compartment at the open portion of the upper end of said tubular member, having a cover and open at one side, a screen extending across the opening at the open side of said compartment, a lower member having a bottom and a wall, a cross member in said lower member to receive a rod and a gauze strainer extending across the top of said lower member between said cross members and between the lower end of said tubular member and the upper end of said lower member, the lower end of said tubular member and the upper end of said lower member having coacting flanges, and a gasket received between the respective flanges.

4. A strainer of the class described, comprising a body with a tapered bottom open at its lower central part, a tubular member having a flange detachably seated on said bottom, said tubular member having a partial cover on top and a partition extending downwardly therefrom dividing the tubular member into two compartments, a second tubular member detachably secured to the first tubular member at the lower end thereof, and a screen held between the tubular members.

5. A strainer of the class described, comprising a body with a tapered bottom open at its lower central part, a tubular member having a flange detachably seated on said bottom, said tubular member having a partial cover on top and a partition extending downwardly therefrom dividing the tubular member into two compartments, and having above the compartment not covered by said top an extension having in its side wall a screen covered opening, a second tubular member detachably secured to the first tubular member at the lower end thereof, and a screen held between the tubular members.

6. A strainer of the class described, comprising a body with a tapered bottom open at its lower central part, a tubular member extending downwardly therefrom having a cross partition dividing said tubular member into compartments, a cover for one of said compartments, a tubular member below the first tubular member detachably secured thereto and a screen element received between the tubular members.

Des Moines, Iowa, January 31, 1923.

ARTHUR O. STUBBS.